United States Patent
Sprunk et al.

(10) Patent No.: US 9,027,159 B2
(45) Date of Patent: May 5, 2015

(54) HANDSHAKE PROTOCOL TO CONTROL ACTORS AND FUNCTIONS IN A CABLE SET-TOP-BOX SYSTEM TO PROPAGATE ACCEPTANCE OF AN IP LICENSE TO SECURELY AUTHENTICATE SOFTWARE APPLICATION PROGRAM INTERFACES (APIS)

(71) Applicant: General Instrument Corporation, Horsham, PA (US)

(72) Inventors: Eric J. Sprunk, Carlsbad, CA (US); Mark G. Depietro, Harleysville, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 14/066,657

(22) Filed: Oct. 29, 2013

(65) Prior Publication Data
US 2014/0123321 A1    May 1, 2014

Related U.S. Application Data

(60) Provisional application No. 61/719,923, filed on Oct. 29, 2012, provisional application No. 61/719,928, filed on Oct. 29, 2012.

(51) Int. Cl.
| H04L 29/06 | (2006.01) |
| H04N 21/235 | (2011.01) |
| H04N 21/435 | (2011.01) |
| H04N 21/647 | (2011.01) |

(Continued)

(52) U.S. Cl.
CPC ....... *H04N 21/2351* (2013.01); *H04N 21/4353* (2013.01); *H04N 21/64715* (2013.01); *G06F 21/10* (2013.01); *G06F 21/105* (2013.01); *H04L 63/126* (2013.01); *G06F 21/121* (2013.01)

(58) Field of Classification Search
None
See application file for complete search history.

(56) References Cited

U.S. PATENT DOCUMENTS

| 4,860,353 A | 8/1989 | Brown |
| 6,961,427 B1 | 11/2005 | Qiu et al. |
| 2006/0173787 A1* | 8/2006 | Weber et al. .................... 705/59 |

(Continued)

OTHER PUBLICATIONS

CableLabs OpenCable specification: CableCARD™ Copy Protection 2.0 Specification, OC-SP-CCCP2.0-I10-090904, 2004, 72 pgs.

(Continued)

*Primary Examiner* — David Pearson
(74) *Attorney, Agent, or Firm* — Thomas A. Ward

(57) ABSTRACT

A system for securely authenticating software Application Program Interfaces (APIs) includes a handshake protocol that enables promulgation of licensing rights controlling Intellectual Property (IP) to multiple Actors. The Actors include components of a cable system that can include a Conditional Access System, Middleware, a Browser for a Set-Top-Box, a Guide and a Guide Data Provider. The handshake is a Challenge-Response protocol that includes a Challenge issued by one Actor who controls IP rights to verify a second Actor has Licensed IP rights when the second Actor Response includes a Hook IP function IPF1. Other Actors who wish to use software functions F that the first Actor provides will be encouraged to acquire rights to the IP License to obtain the function IPF1 for access. Subsequent Actors who have IP rights controlled by another function IPF2 can be pulled into the same IP Licensing system, or another IP License that becomes part of the same ecosystem with the system controlled using function IPF1.

8 Claims, 5 Drawing Sheets

(51) Int. Cl.
*G06F 21/10* (2013.01)
*G06F 21/12* (2013.01)

(56) References Cited

U.S. PATENT DOCUMENTS

| | | | |
|---|---|---|---|
| 2007/0053513 A1* | 3/2007 | Hoffberg | 380/201 |
| 2008/0059797 A1* | 3/2008 | Tokuno et al. | 713/171 |
| 2011/0030040 A1 | 2/2011 | Ronchi et al. | |
| 2011/0197077 A1 | 8/2011 | Chan et al. | |
| 2013/0174238 A1* | 7/2013 | Wang et al. | 726/7 |

OTHER PUBLICATIONS

Anonymous, " Hook IP—Wikipedia, the free encyclopedia", retrieved from <http://en.wikipedia.org/w/index.php?title=Compliance_and_Robustness&action=edit&section=6>, on Aug. 28, 2014.

CableLabs OpenCable Specifications, "CableCARD Copy Protection 2.0 Specification", OC-SP-CCP2.0-I12-120531, 2004, 76 pgs.

"DVB CSA Algorithm", European Telecommunications Standards Institute (ETSI), retrieved from <http://www.etsi.org/index.php/services/security-algorithms/dvb-csa-algorithm> on Aug. 28, 2014.

"DVA CCA (DVD Copy Control Association)" home page, retrieved from <http://www.dvdcca.org/> on Aug. 28, 2014.

"DTLA(Digital Transmission Licensing Administrator" home page, retrieved from <http://www.dtcp.com/> on Aug. 28, 2014.

"DCP (Digital Content Protection)" home page, retrieved from <http://www.digital-cp.com/> on Aug. 28, 2014.

"4C Entity" home page, retrieved from <http://www.4centity.com/> on Aug. 28, 2014.

"CMLA (Content Management License Administrator)" home page, retrieved from <http://www.cm-la.com/> on Aug. 28, 2014.

"AACS (Advanced Access Content System)" home page, retrieved from <http://www.aacsla.com/home> on Aug. 28, 2014.

PCT Search Report and Written Opinion, RE: Application #PCT/US2013/067353, Mar. 3, 2014.

Anonymous, "Challenge-resposne authentication—Wikipedia, the free encyclopedia", retrieved from <http://en.wikipedia.org/w/index.php?title=Challenge%E2%80%93response_authentication%oldid=511227391> on Feb. 12, 2014.

* cited by examiner

| Actor | Needs | Hook IP |
|-------|-------|---------|
| A1 | F0 | none |
| A2 | F1A | HIP1 |
| A3 | F2B | HIP3 |
|    | F1B | HIP2 |
| A4 | F2A | HIP4 |
|    | F3 | HIP5 |
| A5 | F4A | HIP6 |
| A6 | F4B | HIP7 |
|    | F3 | HIP5 |

HANDSHAKE PROTOCOL TO CONTROL ACTORS AND FUNCTIONS IN A CABLE SET-TOP-BOX SYSTEM TO PROPAGATE ACCEPTANCE OF AN IP LICENSE TO SECURELY AUTHENTICATE SOFTWARE APPLICATION PROGRAM INTERFACES (APIS)

BACKGROUND CROSS REFERENCE TO RELATED APPLICATIONS

This Application claims priority under 35 U.S.C. §119(e) from earlier filed U.S. Provisional Application Ser. Nos. 61/719,923 and 61/719,928, both filed on Oct. 29, 2012, and both incorporated herein by reference in their entirety.

BACKGROUND

1. Technical Field

The present invention relates to secure authentication of access to software capabilities through Application Program Interfaces (APIs). In particular, the present invention relates to the use of a regime to enable software API usage and authentication using a concept known as Hook IP.

2. Related Art

I. Hook IP—General Definition

Hook IP provides a way often to enable access to some patented technology, often as part of a trust establishment mechanism. This means that anyone wanting to implement a software function or API such as Digital Rights Management (DRM) must do so in a way that will be covered by certain "Hook IP" patents. A condition of obtaining such a Hook IP license is to follow the terms of the license relating to the patents as well as other Intellectual Property (IP) such as potential trade secrets and copyrights. The aforementioned licensed IP "hooks" in other business obligations, hence the name "Hook IP." Using patents, a license provider has a potential 20-year window before Hook IP the patents expire to pursue legal measures against a "rogue" implementation that violates the license on the grounds of patent violation, rather than having to rely only on e.g. a copyright covering the software that may be readily available under an open source license, or a trade secret that may be reverse engineered.

One well-known example of a system employing such Hook IP is the Digital Video Broadcast (DVB) Common Scrambling Algorithm (DVB-CSA), which is now standardized by the European Television Standards Institute (ETSI), and includes patented elements that are only licensed to approved conditional access system (CAS) vendors who agree to license the patents and maintain the integrity of the algorithm in their chip designs.

II. Hook IP—Known Uses

The term "Hook IP" in the past has been defined to mean using patents or other technological Intellectual Property (IP) in a licensing scheme where the Hook IP is being used in conjunction with encryption of media content (e.g. video or audio or data) for transfer protection. The term Hook IP was commonly known in the security arena by the late 1990's. Some known implementations of the concept are:

(1) A Digital Video Broadcasting (DVB) system dating from about 1994. The system was covered by two patents covering a Common Scrambling Algorithm (CSA) encryption algorithm to efficiently encrypt video streams. The system source was a cable headend or satellite uplink that provided media content through a cable, satellite, or terrestrial signal path to a receiver set top box.

(2) A Digital Video Disk Copy Control Association (DVD-CCA) system dated from about 1996. This system used a Content Scrambling System (CSS) algorithm that was licensed as a Trade Secret providing for encryption of DVD content. The system operated using a DVD player.

(3) A Digital Transmission Licensing Administrator (DTLA) system dated from about 1998. This system provided a cryptographic protocol that was covered by a patent as well as trade secret Elliptic Curve Cryptography (ECC) Public Key Infrastructure (PKI) that provided for encryption of Digital Living Network Alliance (DLNA) and 1394 Firewire content. The system operated using a Network Transmitter that transmitted over a Firewire or Transmission Control Protocol/Internet Protocol (TCPIP) interface to a Network Receiver.

(4) A Content Protection for Recordable Media (CPRM) Entity dated from about 1999. The system covers a Cryptomeria Cipher and a facsimile key that were used to encrypt content on media. The system operated using removable media, such as an SD card.

(5) A Cable Labs CableCard dated from about 2000. The system was covered by two Motorola Download-Fast (DFAST) patents providing for encryption of the CableCard Interface. The system operated using a Cablecard Interface PCMCIA to access a Set Top Box.

(6) A Digital Content Protection (DCP) system dated from about 2000. The system covers two versions of High-Bandwidth (HDCP) by providing High-Definition Multimedia Interface (HDMI) encryption. The system provides an interface from a set-top box over an HDMI interface to a digital video display.

(7) A Content Management License Administrator (CMLA) system dated from about 2004. This system is believed to be covered by trade secrets for an RSA PKI, rather than patents, and provides for encryption for wireless devices. The system enables delivery of cell phone content over a cellular network.

(8) An Advanced Access Content System (AACS) system dated from about 2005. The system is believed covered by traitor tracing patents that covered encryption for Blu-ray disks. The system enables encryption of Blu-ray Disks that will be recognized for playback by a Blu-ray player.

Aside from the CableCard system of (5) above, the specifics of IP involved in the list (1)-(8) for Hook IP license arrangements, are not known, and could involve any or all of patents, trade secrets or copyrights. In the case of the Cable Card system (5), CableLabs used Motorola Hook IP for a licensing regime of CableCard copy protection. Motorola donated U.S. Pat. No. 4,860,353 ("DFAST1"), granted 22 Aug. 1989 for this purpose. DFAST1 had a remaining lifespan before expiration of 6 years at that time. The desire to increase the period of control of CableLabs over CableCard resulted in Motorola's invention of "DFAST2", which was filed 21 Nov. 2000, and granted as U.S. Pat. No. 6,961,427. DFAST2 will expire on 21 Nov. 2020, which created a total lifespan of 20 years for CableCard, with 8 years remaining as of 2013.

III. Hook IP—Defined with Ecosystem and Business Controls

The term "Ecosystem" is used here to mean a set of business, technology, and licensing interrelationships that work together for mutual benefit. Although an Ecosystem may or may not include Hook IP, our use herein comprises only Ecosystems that contain Hook IP. For the ecosystem to thrive from a business perspective, it must have rules. Those rules must govern the positive behaviors that ecosystem Actors must engage in, as well as the negative behaviors that are undesirable and prohibited. And, since misbehavior is inevitable, there needs to be a means to discipline Actors that behave improperly.

The "Founders" of the ecosystem usually have a joint interest in creating and maintaining the ecosystem stability. The term "Founders" is used because the Ecosystem operators typically are early entrants to the Ecosystem, or entities that otherwise aggressively compete in the Ecosystem.

A "Licensing Entity" can be formed by a pooling of resources of the Founders to form a narrow-purpose "Licensing Entity" that will administer and police the ecosystem they wish to create. The Founders, and by their direction the Licensing Entity usually have a list of controls or ecosystem rules that they wish to obligate or impose upon all Actor participants in the ecosystem they govern, their goal being facilitation of a stable ecosystem that is mutually beneficial to all participants. Going forward, the Licensing Entity will be referenced herein as a proxy for the Founders.

Controls imposed by the Licensing Entity include both (1) business controls and (2) technical controls. The business controls (1) can include intellectual property (IP) ownership, or other legal restrictions that can result in liability, $3^{rd}$ party damages or consequential damages for improper behavior. The IP ownership can also be used to grant the rights to practice the Licensing Entity solutions as judged by the Licensing Entity, i.e. another business control. The final business control follows the ability of granting rights in that it gives the ability to bar or exclude a party from bad behavior as deemed appropriate by the Licensing Entity. Technical controls (2) include important Ecosystem-wide implementation "robustness rules" of the system to prevent a technical attack, such as deciphering encoding or having IP rights that can be avoided, without which the Ecosystem may lose its fundamental viability. The technical rules also include "compliance rules" that might include technology design rules that Actor devices or software must comply with under terms of a licensing agreement.

The business controls outweigh technical controls in the use of Hook IP. The Hook IP technology is really a side show to these business objectives and, along with careful use of Hook IP, the business obligations enables enforcement of the Hook IP system as described later in this document.

IV. Conventional Hook IP—Problem & Solutions

Several general descriptions of the prior art Hook IP are provided below that follow the general definition of Hook IP above that are based on patent licensing. Each Hook IP solution is driven by a technical problem. The conventional Hook IP problem and solutions are all analyzed to follow.

A. Problem1—The Secure Transfer Problem

Problem1 is the secure transfer problem, or the need to provide encryption necessary to protect some Asset. Encryption is based on establishing mutual trust in the decrypters and encrypters. The "Licensing Entity" is often a standards body like Digital Video Broadcast (DVB) or an industry consortium standards body like CableLabs or Digital Video Disk Copy Control Association (DVD-CCA) that have the technical "Problem1" to be solved.

Independent of Problem1, the Licensing Entity has controls that they wish to obligate or impose upon participants. The Licensing Entity seeks a means of forcing the controls onto all ecosystem participants in a fully-binding, legally licensed manner, with enforcement provided in case of misbehavior. The role of Hook IP in this situation is not necessarily to prevent bad actors or rogue implementations per se, but to create a patent infringement enforcement means should a rogue implementation be discovered by the Licensing Entity.

Problem1 has four different technical solutions, possibly using either Existing Patent Technology (EPT) and/or "Potentially Patentable Technology" (PPT). Depending on how much (if any) of EPT or PPT is used, different degrees of business IP protection are achieved. Details of the business protection provided by Solution1-Solution4 to Problem1 are described to follow.

B. Solution1

Solution1 uses technology that is covered by expired patents, i.e. neither EPT or PPT. A Licensing Entity choosing to use Solution1 can only use Trade Secret or Copyright rights as the contractual consideration for its grants to Licensees. Trade Secrets can, however, be legally overcome by a party's reverse engineering, which nullifies their enforcement. Copyrights can also be legally circumvented through independent software recoding to intentionally avoid the copyrighted material and nullify the value of copyright material as an enforcement entity. The Solution1 regime, without patent rights for enforcement, has very little survivability in a competitive world, and can be substantially ineffective in protecting the Asset.

C. Solution2

Solution2 does not use any Existing Patented Technology (EPT), but may contain Potentially Patentable Technology (PPT) or sufficient inventive matter to apply for a patent with an unknown chance of future grant. For a Licensing Entity choosing to use Solution2, there is an uncertain multi-year delay period where the Licensing Entity does not know if it can effectively enforce its control. During this uncertainty period, Solution2 has the characteristics of Solution1 above, and is less effective in protecting the Asset.

D. Solution3

Solution3 uses Existing Patented Technology (EPT). For a Licensing Entity choosing to use Solution3, the EPT is immediately available to enforce Solution3 through patent licensing. There is no delay or uncertainty associated with a pending patent application. The enforcement utility of EPT, however, is confined to the grant period before the patents expire. For the EPT to be valid at the time of the Licensing Entity's decision to use it, since the patent period of 20 years begins at filing, the patent probably has been granted for some years, leaving an average of only perhaps 8-12 years remaining Once the EPT patents expire, Solution3 has the negative characteristics of Solution1 above, or worse since some copyright or trade secret protection may remain in Solution1, and it will be ineffective in protecting the Asset the Licensing Entity seeks. Solution3 can therefore have a short useful lifespan. A very short lifespan, for example of one or two years remaining, would make Solution3 pointless from the perspective of the Licensing Entity's enforcement goals.

E. Solution4

Solution4 uses a mix of EPT and PPT. For a Licensing Entity choosing to use Solution4, EPT is immediately available to enforce patent licensing, without the delay or uncertainty associated with a pending patent application. The initial enforcement utility of EPT is confined to the lifespan of its patent(s), which may be long or short. The PPT patent application filing timing should, then, be controlled so that it issues as a patent prior to expiration of the EPT. A few years overlap may be needed to allow reasonable prosecution time in the patent office. The desire is to file the PPT as late as possible, however, to extend the lifespan of the PPT as long as possible following the EPT. Given an average lifespan of EPT of 8-12 years and the filing of PPT at that same time, the total period of enforcement for Licensing Entity could fall in the range of 28-32 years.

Comparing Solution1-Solution4, Solution4 typically will provide the best protection for a Licensing Entity if patent enforcement is available. Solution3 provides the next best protection with patents involved. Solution2 is highly speculative and has limited confident business control for the Licensing Entity until the PPT grant. Solution1 offers minimal utility with no patent protection available.

V. Conventional Hook IP Devices: Source-Channel-Destination

In previous uses of Hook IP listed above, the Licensing Entity used Hook IP as a solution to Problem1 to provide "Secure Content Transfer." All these prior art example cases solved "Problem1" in the same manner. First, the valuable content had to be moved securely from a source to a destination. Second, the source and destination were always two distinct physical devices connected by a communications channel.

Although the source and destination physical devices were connected by a channel, the nature of each element in the system varied. The source varied from being 1000's of miles away from the destination with e.g. a DVB implementation to a few inches away e.g. in systems such as a DVD CCA or CPRM. The source provided a trusted point where encryption took place. The channel was not trusted, and could be a radio signal over the air or a long wire, or digital bits recorded on a storage device. The destination provided a trusted place for decryption where the content was either stored or used by being displayed to a user.

FIG. 1 illustrates the source-channel-destination system described for previous Hook IP systems. The source 100 provides the asset through encryption when the source has signed a Hook IP license agreement. The destination 102 then decrypts the asset when the destination has signed a Hook IP license agreement and provides the decrypted asset for use. As shown, the encryption and decryption are tightly coupled to the Hook IP license.

VI. Conventional Hook IP—Summary

The prior art Hook IP situation described above can be summarized as a set of business goals that leverage the technical solution to Problem1 to force licensees to agree to a list of terms and conditions dictated by a Licensing Entity in a way that allows assertion of patent or other IP for enforcement of technology constraints and prevention of use of the technology by unauthorized parties. Licensees as well as rogue implementers were required to use the Hook IP because of the inherent nature of encryption in the system that employed the Hook IP. The Hook IP basically "rode along" with the encryption protection in a mandatory. To the extent that the chosen encryption is reasonably strong and cannot be circumvented, a party had to access encryption secrets to get the valuable content. Hook IP added to the encryption protection to further control and provide business protection over the content. Without this intertwining between encryption and Hook IP, the scheme collapsed.

INVENTION SUMMARY

I. Problem Statement

In contrast to previous systems, embodiments of the present invention solve the problem of how to achieve the business goals of the Hook IP Ecosystem described above, but in a situation where there is no content encryption to base Hook IP upon. In other words, the problem to be solved is not Problem1.

A further problem that embodiments of the present invention solves is how to provide a system where software is being used, typically through an API, that does not involve predetermined hardware devices, for instance when the software is being used with or within a computing cloud.

Also, consider the case where there is no valuable content asset to transfer securely, yet there is still a desire to establish a mutually beneficial, stable Ecosystem with enforceable business rules. This case is where the situation may not involve any video or audio or other asset to transfer from one party to another, yet there is still a need to somehow use Hook IP and establish an Ecosystem. Another situation of no valuable content might occur when the subject content asset is not covered by IP including patents, copyrights or trade secrets at all; i.e. it is not valuable enough to warrant encrypted transfer. In either case of no valuable content, it is assumed that the same business benefits of using Hook IP are desired, even though there still may be no content per se to transfer, or no encryption of what content is present.

In the previous Hook IP cases, the access to protected valuable content was the motivator for Licensees to sign up to the Licensing Regime. Parties wanted to get access, and access was available once the content was encrypted. They still had to sign a License. How to achieve the business effect of this, when there is no encryption and content may not be valuable, requires a motivator. The Ecosystem participants need motivation to encourage them to sign up to the Licensing Regime.

II. Summary of New Embodiments

Embodiments of the present invention provide a system that can solve the above described problems. The new system also provides benefits of previous Hook IP Regimes including Compliance and Robustness Rules, Liability Obligations, etc. The new system can further still be enforceable using a patented system, such as used in a prior art Hook IP implementations. Preferably such a new Hook IP system can include both existing patent technology as well as future patented technology, as described in Solution4 above.

A system of embodiments of the present invention that can accomplish this includes a new handshake protocol that will employ Hook IP. The system is further provided in a generalized Hook IP ecosystem that includes: (1) A Licensing Entity; (2) Actors A1, A2, etc.; (3) Business Obligations imposed on Actors; and (4) Functions F1, F2 . . . that are implemented by the Actors. The Licensing Entity controls access to patent rights of Hook IP, and is responsible for imposing business rules upon the ecosystem. The Actors are the desired participants within the ecosystem and operate hardware or software products that the Licensing Entity desires to control. The Obligations imposed by the Licensing Entity will include the patent rights or other IP rights. The Functions are implemented by the Actors to enable the Handshaking to occur.

III. Handshake Protocol to Propagate License through Cable System Components

Embodiments of the present invention include a handshake protocol that is provided to validate whether the parties involved are Licensed to use the Hook IP. The Handshake is a Challenge/Response protocol, and includes the following steps. First, a Claimant sends a request to a Verifier requesting access use an API of said Verifier. The Claimant and Verifier can be arbitrary data processing computers such as cloud computing platforms, or they can be more specific devices such as a cable system set-top-box, middleware or a CAS. The Verifier reacts to the request by outputting a Challenge that is sent to the Claimant. The Claimant next processes the Challenge using a Hook IP function, such as IPF1, IPF2 . . . and issues a Response defined by said Hook IP that is transmitted back to the Verifier. The Verifier compares the possibly-correct Candidate Response to determine if the Claimant can be allowed access to the API. The Claimant and Verifier are both Actors in the system. The system can be a cable system that includes the following Actors: a Conditional Access System, Middleware, a Browser for a Set-Top-Box, a Guide and a Guide Data Provider For the functions IPF1, IPF2 . . . a series of linkages with Actors are created with the Handshake as follows. The Actors that want another Actor's software function F need Hook IP which is required by the Handshake. Hook IP will require a License from the Licensing Entity. Multiple Actors A1 and A2 may require a single function F1 or a number of separate functions F1 and F2 from licensing Hook IP. For example, two Actors A1 and A2 may each have different functions F1 and F2, each of which is viewed as necessary and valuable to the other. In that case Actor A1 may act as the Verifier for F1 with A2 as Claimant, and A2 may act as Verifier for F2 with A1 as Claimant.

The system allows a single Licensing Entity to control multiple Actors that need to access a single function F1. This is achieved by beginning with a license agreement imposed upon an Actor A1 that owns or implements F1. The desirability of F1 then transfers the Licensing Regime to all other indirect users of F1, thereby spreading the Licensing Regime. Note that only Actor A1 implements F1; other users of F1 use F1 indirectly by asking A1 to operation function F1 for them, typically through an interface or API. The ecosystem further goes beyond F1 to promulgate the Licensing Regime beyond just the Alpha Actors that use F1 to get to a function F2, F3 . . . . The steps to propagate the license through F2 are as follows: 1. Initially, the Licensing Regime is signed up to by all Alpha Actors that wish to implement or own F1. 2. The Licensing Regime is "pulled through" (or imposed) upon all Beta Actors that wish to use F1 though said A1 interface or API for F1. 3. Located within the terms and conditions of the Licensing Regime is an obligation for Beta Actors licensed to require the successful completion of the Handshake Protocol before that Beta Actor will perform another function F2 for another Actor requesting F2 through A2's API. 4. This requirement to use Hook IP in Handshake Protocol access to function F2 is imposed on any Actor that takes a License for using function F2. The Alpha Actor's F1 thus "pulls the Handshake and its Hook IP through" to the Beta Actor's F2. 5. A like means can promulgate the Licensing Regime forward through F3, F4, etc. to an arbitrary number of functions and Actors. This cascade effect allows the utility of a single ecosystem function F1 implemented by a small group of Actors to spread the obligation for Hook IP and the Licensing Regime throughout a potentially very large and diverse ecosystem.

BRIEF DESCRIPTION OF THE DRAWINGS

Further details of the present invention are explained with the help of the attached drawings in which.

DETAILED DESCRIPTION

I. New Hook IP System—Overview

Figure 1:
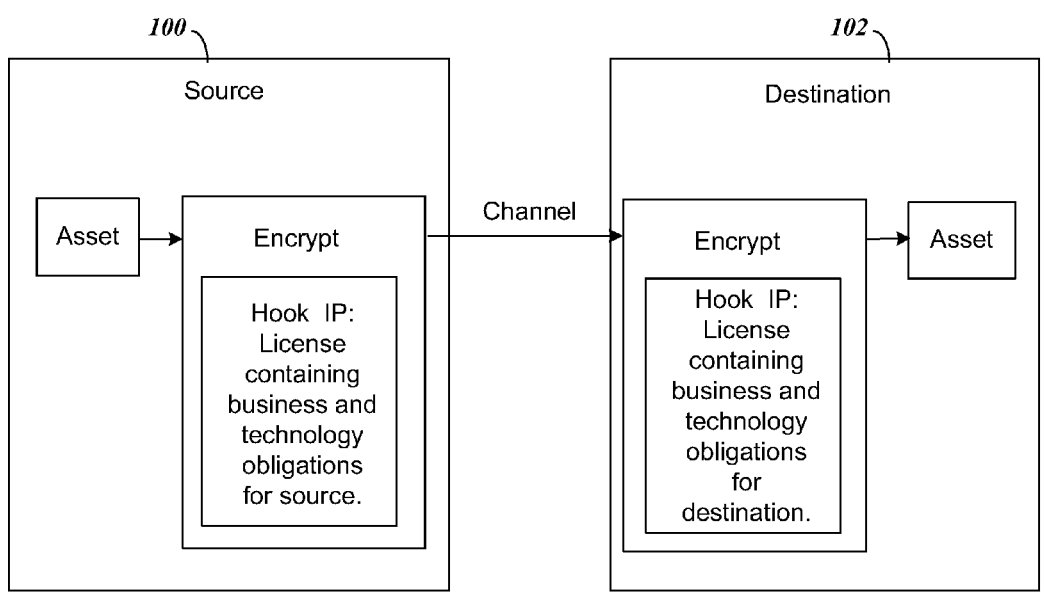
FIG. 1 diagrams a prior art system with a Hook IP License used to access software from a source to a destination.

A system of embodiment of the present invention that can accomplish this includes a new handshake protocol that will employ Hook IP. The system is further provided in a generalized Hook IP ecosystem that includes:

(1) A Licensing Entity that controls access to patent rights to Hook IP, and is responsible for imposing business rules upon all ecosystem participants.

(2) Actors A1, A2 . . . who desire to be participants within the ecosystem. Actors are entities that wish to engage in commerce within that ecosystem by offering products or services that would need access the Hook IP patent rights. The Licensing Entity will want all Actors to sign up as Licensees to be able to use Hook IP and enforce all necessary business rules.

(3) Business Obligations that the Licensing Entity imposes on all Actors, which can include patent rights, robustness rules, compliance rules, etc.

(4) Functions F1, F2 . . . that exist within the system and are implemented by the Actor(s). The functions can be implemented in hardware, e.g. an MPEG decompression chip. The functions could also be implemented in software, e.g. Conditional Access System (CAS) software running on a set top box as delivered through a middleware API.

First the Handshake Protocol will be described, and then the methods of use by the Licensing Entity to achieve its goals of ecosystem control with Hook IP technology will be described.

II. Handshake Protocol—Challenge/Response Protocols

The Handshake is provided to validate whether the parties involved are Licensed to use the Hook IP. The Handshake is one of several Challenge/Response protocols, and includes the following steps.

(1) First, a Claimant begins the Handshake by sending a request to a Verifier. The Claimant by sending the request will be essentially claiming to be a member of the Licensing Regime by beginning the Handshake protocol.

(2) The Verifier reacts to the request by outputting a Challenge that is sent to the Claimant. The challenge is also retained by the Verifier for use in its internal calculation to verify the Claimant's response. The Challenge retained is processed using Hook IP and Administrative Info to create a Target Response that is held in memory of the Verifier to validate the reply from the Claimant. The Admin Info can contain one or more of a unique ID, unique name, or the Claimant name. The Admin Info can be either transferred to the Claimant as part of the Challenge, or is already provided to the Claimant based on their notification as a Licensee. The Target response prepared by the Verifier for verification is not accessible by the Claimant and will be later proven based on the Claimant's response to the Challenge to indicate that the Claimant is licensed to use the Hook IP and also possesses the Admin Info.

(3) The Claimant next processes the Challenge using Hook IP and issues a Response that is transmitted back to the Verifier. The Claimant uses the Admin Info, Challenge and Hook IP to process and create the Candidate Response. When the Candidate Response equals the Target Response, it has been proven that the Claimant possesses the Hook IP and Admin Info correctly.

(4) The Verifier compares the possibly-correct Candidate Response from the Claimant to the known-correct Target Response it originally calculated using the Retained Challenge. The strength of the Verifier's conclusion that the Claimant is a member of the Licensing Regime depends upon the following string of interlocked components: (a) The extent that the Candidate Response cannot be created without the Hook IP and Admin Info; (b) The extent the Hook IP technology used is difficult to circumvent or avoid; (c) The extent the Hook IP employs a cryptographic one way or one way trap door function that allows further maximization of the Candidate Response strength. Said function could comprise a keyed has using algorithms such as Secure Hash Algorithms (SHA), or an asymmetric digital signature such as RSA, Digital Signature Algorithm (DSA), El Gamal or Elliptic Curve DSA (ECDSA).

The Verifier during the comparison can determine if the Candidate Response is (1) identical to the Target response or (2) not identical to the Target response. If the Target response is (1) identical to the Candidate Response, the Verifier knows that both the Claimant and Verifier possess the same Hook IP and Admin Info. The verifier cannot tell if the Claimant illegally posses the Hook IP. If the Claimant's possession is illegal and unlicensed, however, and the Claimant proceeds it will be committing patent infringement of any underlying patented technology. With the Target response being identical, whether the Claimant is licensed or not, the Verifier will begin performing its function to enable the requesting Claimant access through its interface or API. If the Target Response is (2) not identical, the Verifier considers the Claimant to be not trusted and declines to perform the Verifier's function to allow the Claimant access through its interface or API. Without the identical Target and Candidate responses, the Claimant is assumed to not have the correct Hook IP, and to not be a member of the Licensing Entity's Regime.

The system in some embodiments allows the Verifier to tell a difference between multiple Claimants, some of whom may have passed the Handshake Protocol and some who may have failed.

The Verifier can notify the Licensing Entity of the Claimant's failed Handshake if such a process is enabled by the specific embodiment. This will enable Patent Infringement enforcement against any party later discovered to have practiced the Hook IP without being a member in good standing in the Licensing Regime. Note that with this basic system it is not possible for either the Claimant or Verifier to directly know if the other party is a validly licensed participant in the Licensing Regime. So if there is a question, and a procedure is in place, the Verifier will need to request the Licensing contractual status of the Claimant in a process separate from Handshaking This is desirable since it can potentially catch Patent Infringing parties early, which is of interest to the Licensing Entity who is charged with enforcing the Licensing Regime on the ecosystem. Other data is typically needed to do this, e.g. a reliable Claimant identification means wherein the Licensed Verifier can query a presumably remote Licensing Entity regarding Claimant's License status. The Licensing verification can also include a security means to resist Rogue Claimants from falsifying a response to the Licensing Entity.

A variation of this invention is where the Handshake Protocol is also used to establish a Shared Secret Value possessed by both Claimant and Verifier. Said Shared Secret Value can be used as an encryption key or cryptographic component in the establishment of encryption, or as an authenticator for use by Claimant and/or Verifier in API transactions after successful completion of the Handshake Protocol. Further variation of this invention include where post-Handshake API calls are authenticated using said Shared Secret Key, or are completely encrypted by it.

Figure 2:
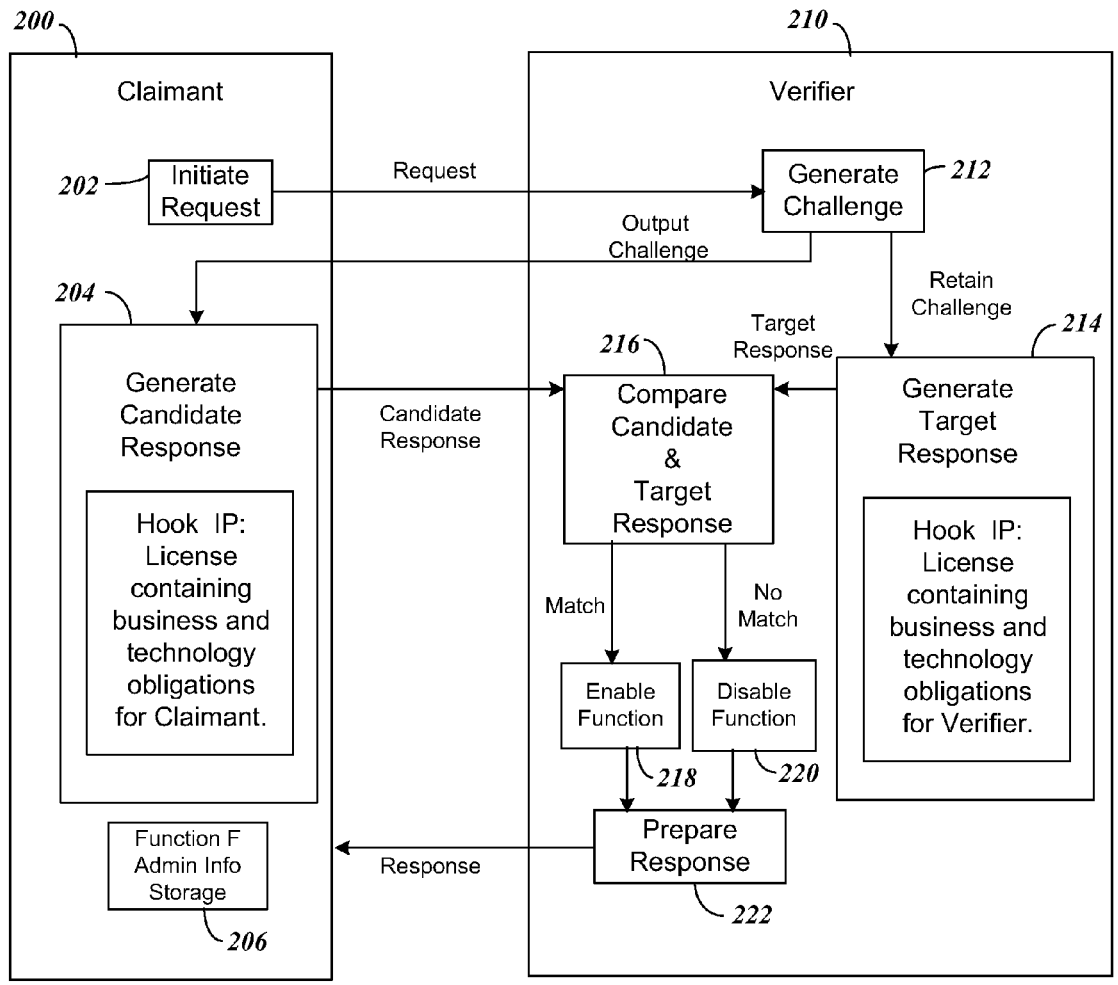
FIG. 2 shows an ecosystem according to the present invention with a handshake procedure provided in order to authenticate a software between a Claimant and a Verifier.

FIG. 2 is a diagram illustrating the Claimant-Verifier Handshaking process. The system shows the Claimant 200 and the Verifier 210. The Claimant 200 and Verifier 210 each include a processor and memory storing code to cause the processor to comply with the handshake process. Internal components of the Claimant 200 and Verifier 210 illustrate code modules that enable the handshaking As shown, the Claimant 200 initially generates a request 202 that is sent to block 212 of Verifier 210 that will in turn generate the Challenge that is sent to the Claimant 200. The challenge generator module 204 of the Claimant 200 then generates a response that has information relating to Hook IP for which it has rights under a signed license. In some cases, the module 204 further provides data for a function F needed for the Challenge, including Admin Info 206 that is stored in memory 206 for the Challenge. The Verifier in step 216 then compares in module 214 the Challenge with a Target Response it has generated. The Target Response was created in module 214 when the Verifier originally created the Challenge using Hook IP license information that is needed with the Challenge to ensure the Claimant 200 has rights under Hook IP. The comparator module 214 outputs a determination if a match is detected, and modules 218 and 220 provide a function depending on whether a match has occurred so that module 222 can provide an appropriate response back to the Claimant 200.

EXAMPLE

Challenge-Response Protocol in Cable Set-Top-Box System

In this example, the system architecture includes a set-top box or similar device, an operating system and middleware, and applications that run on top the middleware that provide content for the set-top box access, the applications potentially residing in cloud memory devices. The set top device includes a System on a Chip (SoC) which performs decryption of the digital content. Encrypted keys are supplied by software stored in ROM to the SoC of the set top. All application programs accessed by the set top device run on top of the middleware. Access to the applications by the set top box or other local hardware resources is done by API calls to the middleware. A variety of services to the user include the CAS Client which is responsible for obtaining authorizations and cryptographic keys (in encrypted form) for decrypting and accessing the digital content (e.g., video and audio). After determining that a particular device is authorized for a particular multimedia service, the CAS client will forward encrypted keys to the hardware via API calls to the middleware layer. As a result, the SoC hardware of the set top will begin decryption, decompression and rendering of the digital content.

In a first variation of this example system, a "Challenge-Response" API mechanism is provided between the CAS client and middleware to ensure secure authentication of the CAS Client API. The CAS in a first example system, rather than middleware, controls the "Challenge." That procedure begins after the user tunes the set-top to a particular channel. The middleware then submits a request for CAS support in order to decrypt the content corresponding to the desired channel. Before granting that request, the CAS App returns back the "Challenge" which can be either a random number of a non-repeating numerical value that had not been previously used by the CAS. The middleware responds by calculating a function over the Challenge value, where that function is patented and referred to herein as Hook IP. The CAS App then verifies the response from the middleware and returns an acknowledgement that the CAS services have been enabled. After the CA App has granted access to CA APIs, it proceeds to provide encrypted keys for use by the SoC by making the corresponding API calls to the Middleware.

The system provides secure control of all of the applications and middleware that are running in a device separate from the encryption and decryption keys. In order to access specific API resources, an application or Middleware provider has to first sign a business agreement and obtain the secret Hook IP algorithm for the Challenge/Response.

In an alternative system example, the flow of APIs is reversed and it is the middleware that issues the "Challenge." Initially in this alternative system, as before, the procedure begins after the user tunes a set-top-box to a particular channel. The CAS submits a request for the middleware to access content decryption APIs that will be used by the CAS to load decryption keys. Before granting that request, the middleware returns back the "Challenge" which can be either a random number of a non-repeating numerical value. The CAS responds by calculating a function over the Challenge value, where that function is patented Hook IP. The middleware then verifies the response from the CAS and returns an acknowledgement that decryption APIs have been enabled. The middleware also returns the "API Handle" that the CAS may subsequently pass to the middleware in order to prove that it has been authorized.

The content for the channel to be delivered in either example case can come from a cable headend, and content keys are also delivered by the cable headend to the CAS. The CAS then passes the content decryption keys that came from the headend and are themselves encrypted to the SoC of the set-top-box via the middleware. Because the Hook IP based authorization has succeeded with the challenge-response scenario, the middleware will pass the encrypted keys to the SoC with the API handle. A user of the set top box can then view the decrypted content on the channel.

In a variation to the example systems, identified herein as "System B," the Response includes an App—Class along with the Challenge calculated in a function "F( ) as follows:

Response=$F$(Challenge,$APP$-Class)

The function F( ) includes both the "Challenge" and the Class of Application that all access different sets of APIs. In order to compute function F( ), an application has to be aware of secret parameters that are associated with a specific APP-Class. CAS Applications are given one set of secret parameters, applications with access to user private data have a different set of secret parameters. The application provider will sign a business agreement for a specific APP-Class and in return will obtain the corresponding secret parameters and will be able to compute the Response.

In a further variation is a system termed "System C," where in addition to performing a challenge-response for a specific class of applications, the middleware has to check permissions or restrictions for a specific device. In this system instances of the same class of applications may have access to different APIs within different physical devices. In addition to performing challenge-response and identifying a specific class of applications, the middleware has to check permissions or restrictions for a specific device. This additional device check may require a request to an external service outside of the middleware to look up authorizations from an object or a file from an external server.

III. Administrative Info, Secret Parameters and Subsequent Encryption

As indicated in part above, measures can be provided to ensure the Challenge-Response Protocol System provides adequate security for API authentication. First, the Administrative Info can be retained to create the Target Response that is held in memory of the Verifier to validate the reply from the Claimant that includes more than just a randomly generated number. As indicated, the Admin Info can contain one or more of a unique ID, unique name, or the Claimant name. The Admin Info can be either transferred to the Claimant as part of the Challenge, or is already provided to the Claimant based on their notification as a Licensee.

The system can further add to the Admin Info by requiring the assignment of non-transitory identifiers or personalities to software instantiations, giving a piece of software a unique and distinct identify similar to how a serial number labels a physical object. Further, as indicated in the example situation, the Response to a Challenge can be a Function that includes an App-Class. As indicated an application provider that will be accessible through an API can sign a business agreement for a specific APP-Class and in return will obtain the corresponding secret parameters to enable them to compute the Response.

As a further protection, subsequent to the completed Challenge-Response, a subsequent encryption can be provided of the data, even though the data was not encrypted prior to the Challenge-Response. Encryption after the Challenge-Response will enable more efficient operation, as after the Challenge-Response, when more data is requested over the API another Challenge-Response scenario is not required as the encryption will signify that a Challenge-Response procedure has already occurred and that the Claimant has a license that is verified under Hook-IP.

IV. Handshake Protocol to Control Actors & Functions

Given a Handshake function as described above, an ecosystem of entities including Functions and Actors all controlled under a common Licensing Regime can be constructed. This is done through making the Hook IP mandatory for the set of desirable functions F1, F2, ... in the Ecosystem, where the Ecosystem Actors that Licensing Entity wishes to control are motivated by their desire to access these functions F1, F2 ... in some way.

For the functions F1, F2 ... a series of linkages with Actors are created with the Handshake as follows. First, the Handshake controls whether or not a function F is made available to any Actor. The Actors that want F need Hook IP which is required by the Handshake. Hook IP will require a License from the Licensing Entity. The License will then carry the other terms and conditions that the Licensing Entity wishes to enforce over the ecosystem.

Multiple Actors A1 and A2 may require a single function F1 or a number of separate functions F1 and F2. For the actors A it will be a matter of perspective as to which function is valuable and which is not. For example, two Actors A1 and A2 may each have different functions F1 and F2, each of which is viewed as necessary and valuable to the other. In that case A1 may act as the Verifier for F1 with A2 as Claimant, and A2 may act as Verifier for F2 with A1 as Claimant. In all cases, the party that needs some function F expresses their need through the Handshake Claimant role to another party that has that function F, who expresses their ability to satisfy a need for F through their role as a Handshake Verifier.

Not all of the actors A may want or need access to a given function F, which in turns means that the Licensing Entity cannot motivate an entire diverse set of ecosystem Actors to accept a single function F. Consequently, an ecosystem may comprise more than one Actor and Function for which the Licensing Entity must construct Handshake Hook IP to control. Various cases involving different numbers of Actors and Functions are described to follow.

A. Degenerate Case: One Actor, any Number of Functions

The ecosystem for embodiments of the present invention hinges upon an interaction between different Actors that seek to use each other's function(s) F. The Handshake occurs when the software or device of one Claimant Actor asks for another Verifier Actor's software or device to perform a function F for it. If there is only one Actor, this situation cannot be satisfied and a degenerate case results. It is meaningless for a single Actor A1 to perform a Handshake with itself using Hook IP. A single Actor case is thus degenerate and will not work, so this case will not be focused upon further. Put colloquially, if a single Actor owns everything, there is never a need for him to ask himself for permission for anything.

B. Case 1: Multiple Actors, Single Function

In this embodiment of the present invention, the Licensing Entity control multiple Actors that need to access a single function F1. This is achieved by beginning with a license agreement imposed upon an Actor A1 that owns or implements F1. The desirability of F1 then transfers the Licensing Regime to all other indirect users of F1, thereby spreading the Licensing Regime. Note that only Actor A1 implements F1; other users of F1 use F1 indirectly by asking A1 to operation function F1 for them through the Handshake Protocol, typically through an interface or API, where the requester acts as a Handshake Claimant and Actor A1 acts as the Handshake Verifier.

For this embodiment there must always be an "Alpha Actor" that is the very first to sign up to the Licensing Regime. The Alpha Actor will design their software or device to require the Handshake and Hook IP to perform its function F1 for other "Beta Actor" devices or software. This first Alpha Actor essentially boot straps the Licensing Regime by being first and using the Hook IP Handshake as a condition of Beta Actor access to F1. All subsequent Beta Actors that implement software or devices that interface to said first Alpha Actor must therefore use this same Hook IP and Handshake, and must sign up to the Licensing Regime to legally do so.

Figure 3:
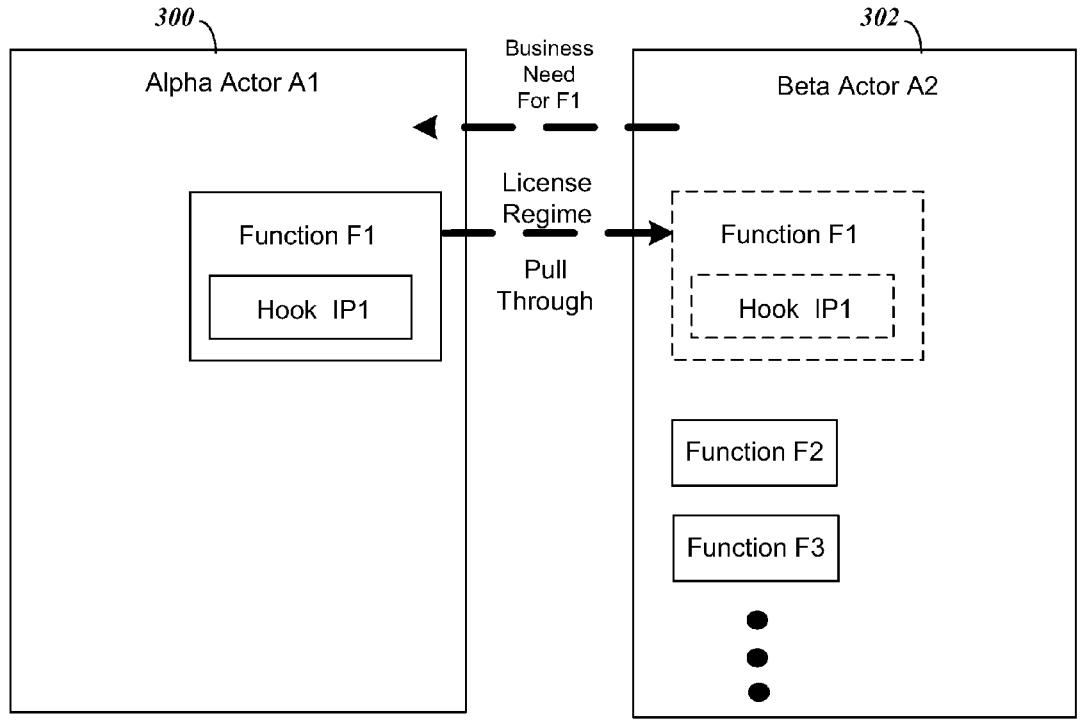
FIG. 3 illustrates how a Hook IP Licensing Regime can be pulled through from an Alpha Actor to a Beta Actor.

FIG. 3 illustrates the ability of Beta Actors to be pulled in to requiring Hook IP based on their need for a function such as F1 from an Alpha Actor. The interfacing Alpha Actor in the ecosystem will create a marketplace force that pushes other Beta Actors to likewise submit to the Licensing Regime. FIG. 3 includes an Alpha Actor 300 that may be the Verifier as in FIG. 2, as well as a Beta Actor 302 that may be the Claimant in FIG. 2. The Alpha Actor 300 controls Hook IP1 licensing rights for function F1. The Beta Actor 302 has a business desire for function F1 that pulls it into signing a license for Hook IP1 so that access can be made for the business desired. The Beta Actor 302 further controls other functions F2, F3 . . . that are separate from F1. The functions F2 and F3 can then be pulled into the ecosystem that can further the license Hook IP1, or create their own separate Licenses for Hook IP2 and Hook IP3, etc.

C. Case 2: Multiple Actors, Multiple Functions

We have seen above how a Licensing Regime can be promulgated through an Alpha Actor to a set of Beta Actors through the Alpha Actor's function F1. There may also be multiple functions F1, F2, . . . and multiple Actors A1, A2 . . . in the Ecosystem that the Licensing Entity wishes to all have under the Licensing Regime. The same or different Hook IP can be used for different functions F1, F2, etc. Two different Hook IP methods are available to provide for multiple actors and multiple functions as discussed to follow.

i. Case 2A: Parallel License Regime Propagation

Hook IP can be introduced in parallel all at one time into the ecosystem with one or more of the functions F1, F2 . . . and Actors A1, A2. So long as all Actors are agreeable to directly signing up to the Licensing Regime, there may be no necessity to indirectly force them. In that case, it is not necessary for there to be an Alpha Actor to create marketplace interoperability pressure on Beta Actors. Such a cooperative, conflict-free ecosystem where IP licensees willingly sign up and pay royalties for a technology license is, however, unlikely to occur in a competitive world.

ii. Case 2B: Cascade License Regime Propagation

In this embodiment the Ecosystem has one function F1 and one or more Alpha Actors, and this used as follows to promulgate the Licensing Regime beyond just the Alpha Actors to Beta and Gamma Actors. F1 is implemented in one Alpha Actor device or piece of software, where F1 will not operate until the Handshake is completed and Hook IP confirmed present in a Beta Actor that requests F1. The steps to propagate the license are as follows:

1. Initially, the Licensing Regime is signed up to by all Alpha Actors that wish to implement or own F1. The Alpha Actor's license from the Licensing Entity obligates it to only offer F1 over an API that uses licensed Hook IP and a Handshake.

2. The Licensing Regime is "pulled through" (or imposed) upon all Beta Actors that wish to use F1 though said A1 interface or API for F1.

3. Located within the terms and conditions of the Licensing Regime is an obligation for Beta Actors licensed thereunder to require the successful completion of the Handshake Protocol before that Beta Actor will perform another function F2 for another "Gamma" Actor requesting F2 through A2's API.

4. This requirement to use Hook IP in Handshake Protocol access to function F2 is imposed on any Gamma Actor that takes a License for using function F2. The Alpha Actor's F1 "pulls the Handshake and its Hook IP through" to the Beta Actor's F2, which is then propagated through to the Gamma Actors that desire use of F2.

5. A like means can promulgate the Licensing Regime forward through F2, F3, etc. to an arbitrary number of functions and Actors.

This cascade effect allows the utility of a single ecosystem function F1 implemented by a small group of Alpha Actors to spread the obligation for Hook IP and the Licensing Regime throughout a potentially very large and diverse ecosystem that contains many Beta, Gamma, etc Actors. Alpha Actor use of Hook IP forces the other Actors to sign up to the Licensing Regime.

Figure 4:
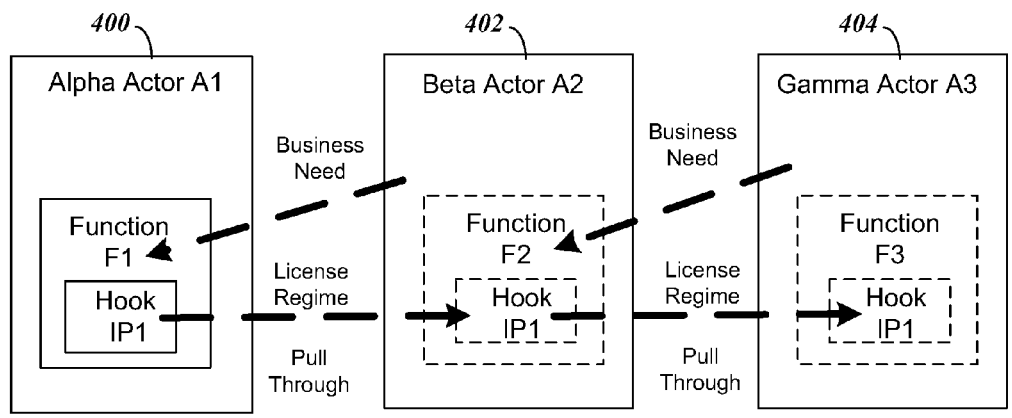
FIG. 4 illustrates how a single first Hook IP Licensing Regime can be pulled through multiple actors including an Alpha, Betta and Gamma Actor.

FIG. 4 shows this concept extends ad infinitum from Alpha Actors 400 to Beta Actors 402, to Gamma Actors 404, etc. The Beta Actor 402 would be pulled into the ecosystem by their wanting to be users of the F1 functions implemented by the Alpha Actor 400. Similarly, the Gamma Actors would be pulled in via their desire to use the F2 functions of the Beta Actors, etc. The same Hook IP1 License will be used for each to increase the ecosystem. Arbitrarily complex ecosystems can be subjected to a Licensing Regime in this way.

Figure 5:
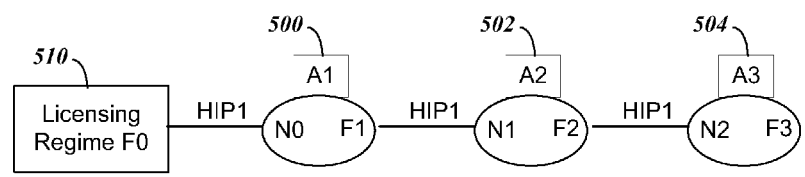
FIG. 5 provides a more concise symbology equivalent to FIG. 4.

FIG. 5 shows a compression of the symbology of FIG. 4 to enable further illustration more complex scenarios in future figures. The symbology in FIG. 5 shows the same scenario as FIG. 4 with components 500, 502 and 504 of FIG. 5 replacing the more detailed symbols 400, 402 and 404 of FIG. 4. FIG. 5 better illustrates a subsequent Actor's need coming into that Actor from the right, labeled numerically in accordance with the function that can satisfy that need. Function F1 is needed in Need N1, etc. The provision of a function F goes out from the Actor symbol to the left. Functions of one Actor thus connect to needs of another Actor. The Licensing Regime 510 is labeled "F0" to denote its instigating role in the ecosystem, and correspondingly Alpha Actor A1's need for Hook IP1 (HIP1) is numbered "N0".

Figure 6:
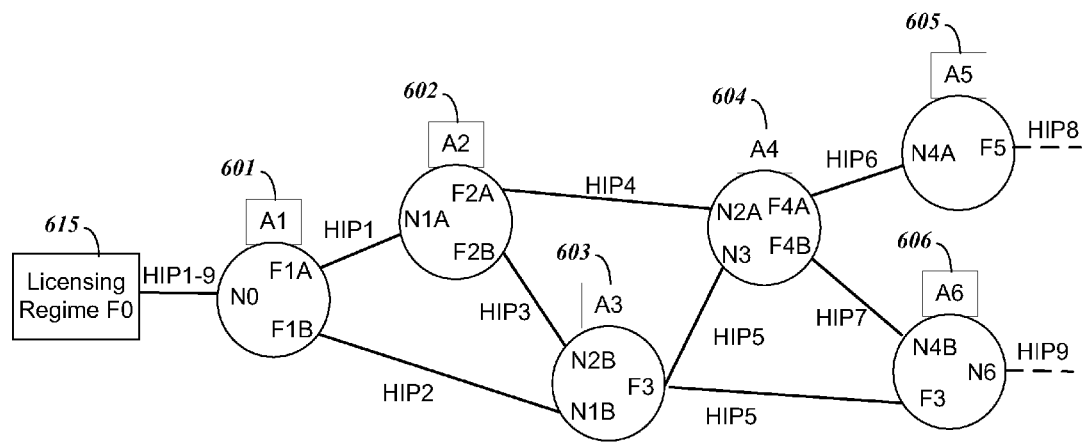
FIG. 6 uses the symbology of FIG. 5 to show a more complex license regime than FIG. 5.

FIG. 6 illustrates where an Actor can have multiple needs (connecting from the left) and multiple functions (connecting from the right). FIG. 6 uses the concise symbology of FIG. 5 to illustrate a more complex ecosystem and the use of multiple types of Hook IP ("HIP") HIP1-9 instead of a single Hook IP License HIP1 to spread a single Licensing Regime through an ecosystem of 6 Actors A1-A6, as labeled 601-606 respectively.

Since the intent of FIG. 6 is to illustrate a complex ecosystem, the case is addressed where each Actor in A1-A6 may act as a Handshake Verifier (or enforcer) for one function it implements and offers to other Actors through an API, and also be a Handshake Claimant for another function that it needs through a different API. A given Actor in A1-A6 can further be a Verifier for a function it owns and a Claimant for other functions that other Actors own. It can be seen that the current invention extends naturally to arbitrarily complex scenarios involving software from different Actors offering functions through APIs to many other Actors, whether on different computing platforms, or a single platform, or a cloud implementation of platforms.

The system of FIG. 6 might be a complexity worst case scenario. It could be even more complex, however, if different types of Hook IP were used in different "directions", i.e. when A1 wants F2 from A2, HIPX is used, but when A2 wants F1 from A1, HIPY is used. There are innumerable variants of such complex ecosystems that are a part of embodiments of this invention.

The operation of the ecosystem of FIG. 6 is described as follows:

1. Initially, each of the 6 Actors A1-A6, labeled 601-606 has its own valuable function(s) F1-F6 which are the economic benefit and purpose for their being in the ecosystem at all. Some Actors have more than one function, e.g. Actor A1 has F1A and F1B. The functions of some Actors may be used by multiple other Actors, e.g. Actor A3's F3 is used by both Actor A4 and Actor A6, both via HIP5. Some Actors may also have multiple needs, meaning they connect to more than one other Actor on the left, e.g. A4 connects to A2 for F2A and A3 for F3.

2. Next, starting with the Licensing Entity, Alpha Actor A1 is convinced to sign up to the Licensing Regime. The License signed by A1 obligates him to use a first form of Hook IP HIP1 for his function F1A and a $2^{nd}$ form HIP2 for his function F2B. A1 uses the appropriate Hook IP in a Handshake with any requester Claimant before A1 allows access to A1's respective valuable functions F1A and F1B over any interface.

3. Next, Alpha Actor A1's use of HIP1 & HIP2 pulls Actors A2 and A3 into the Licensing Regime. HIP1 is necessary for A2 to access function F1A. HIP2 is necessary for A3 to access function F1B.

4. Next, the Licensing Regime obligates Actors A2 and A3 to use HIP3, HIP4, or HIP5 when a requesting party tries to access F2A or F2B or F3, as follows. HIP3 is necessary for A3 to access function F2B. HIP4 is necessary for A4 to access function F2A. HIP5 is necessary for A4 or A6 to access function F3.

5. Further, the Licensing Regime obligates Actors A4 to use HIP6, or HIP7 when a requesting party tries to access F4A or F4B. HIP6 is necessary for A5 to access function F4A. HIP7 is necessary for A6 to access function F4B. Were additional Actors to need F5 from A5 or F6 from A6, similar obligations to use HIP8 and HIP9 could be given to A5 and A6 respectively.

Figures 7, 8:
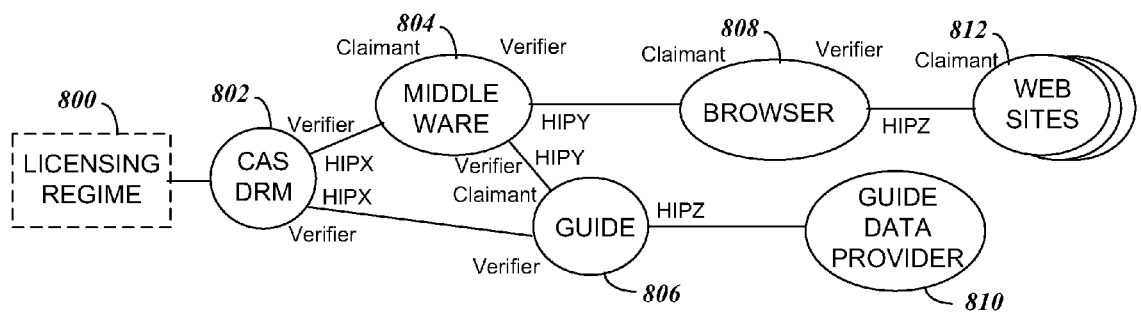
FIG. 7 shows in table form the Actors, Functions and Hook IP for the FIG. 6 Ecosystem.
FIG. 8 illustrates components of an example ecosystem with components from a cable system.

The Licensing Regime contracts signed by an ecosystem Actor thus obligate it to use the chosen Hook IP to implement functions as depicted in FIG. 6. Those contracts may obligate an actor to use one form of Hook IP when acting as a Claimant through an API to some other actor, and a different form of Hook IP when acting as a Verifier through a different API to some different other actor. FIG. 7 shows in table form the functions and obligations implemented in FIG. 6.

The process and concept illustrated in FIGS. 6-7 can be extended ad infinitum, pulling other Actors into the Licensing Regime to implement any arbitrary set of legal obligation relationships among the Licensing Entity, all Actors, and all Actor's functions that they provide to the ecosystem, where this is achieved using various different types of Hook IP.

Note that, in the complex ecosystems shown in FIG. 6, nine different types of Hook IP are shown. Depending on the exact technical nature of the Hook IP, it may be easy or difficult to readily create nine variations for such an ecosystem. Alternatively, the "Admin Info" mentioned previously can be used with a single type of Hook IP to create an arbitrary number of variations. An example is where the Admin Info comprises a "Hook IP Type" data item, such as a 16 bit data field. Such a Hook IP Type would easily allow 65,536 different variations of the same basic type of Hook IP.

The only disadvantage of such an approach is that any Licensee in the Licensing Regime inherently has access to all those variants should they alter the Hook IP Type field. Such an alteration may be a contractual violation of the License they signed, but it may not constitute patent infringement. It is therefore more reliable if each different type of Hook IP was controlled by a different patent, where each distinct one required a different patent right for any party to use it. This may be difficult to implement in practice given the large number of similar patents that may be required.

The Admin Info could also contain encryption keys for added security characteristics, or entitlement lists of other control data used to instantiate more complex control scenarios. Using the Admin Info field, a Licensing Entity could create a very wide range of coarse or fine grain control mechanisms for an ecosystem.

EXAMPLE

Actor-Function Propagation in Cable System with CAS/DRM Provider

We now illustrate the concepts above that have Actors and Functions that propagate in a concrete manner, the example using a cable set top box and its software as an example. In the example, the following list of participants are included in the cable operator's ecosystem of vendors: (1) A License Entity (LICENT), equivalent to "Licensing Entity". The LICENT imposes a Licensing Regime (LICREG) upon the entire ecosystem, including Robustness Rules, Compliance Rules, Penalty Clauses, and Liability. LICREG contains rights for Actors to act as Handshake Claimants or Verifiers, as appropriate. The LICENT has rights to license Hook IP "X," "Y," and "Z" (HIPX, HIPY and HIPZ) to use in propagating the LICREG to different parties. HIPX, HIPY and HIPZ are based on a cryptographic one way function used in the Handshake. (2) A CAS & DRM (CASDRM) provides an "Actor 1", also known as the "Alpha Actor". (3) Cable Middleware (MIDDLEWARE) provides "Actor 2", or the "Beta Actor". (4) A Guide Vendor provides "Actor 4", the "Gamma Actor". A set-top-box browser (BROWSER) provides "Actor 5", a "Delta Actor".

In the example, operation proceeds in the following sequence:

1. LICENT persuades the Actor 1, CASDRM, to be the Alpha Actor by signing up the LICREG. CASDRM will use HIPX as a Handshake Verifier, and has no role or Hook IP for any Claimant role. The fact that CASDRM is now a Licensee is made public knowledge, along with the fact that no one can get access to CASDRM functions in the Ecosystem without exercising the CASDRM API as a Verifier, which uses the Handshake, which uses HIPX, which requires LICREG.

2. LICENT then offers LICREG to anyone.

3. Both MIDDLEWARE and GUIDE become aware that they both need access to the functions of CASDRM. MIDDLEWARE and GUIDE both sign up to LICREG to gain such CASDRM access. MIDDLEWARE and GUIDE's new LICREG grants them use of HIPX for CASDRM access as a Claimant, and also contains the obligation for them to use HIPY as a Verifier for any party that seeks to access MIDDLEWARE or the GUIDE's functions. The fact that MIDDLEWARE and GUIDE are both Licensees is made public knowledge, along with the fact that no one can get access to MIDDLEWARE or GUIDE functions in the ecosystem without exercising the MIDDLEWARE or GUIDE APIs as Claimants, which uses the Handshake, which uses HIPY, which requires LICREG. Both MIDDLEWARE and GUIDE will use HIPX when accessing CASDRM as Claimants, and will use HIPY as Verifiers when any other party tries to access their functions.

4. GUIDE now becomes aware that he needs access to the functions of MIDDLEWARE as well as CASDRM. GUIDE signs up to additional LICREG terms to gain such additional access to MIDDLEWARE, which grant allows GUIDE to use HIPY as a Handshake Claimant to access MIDDLEWARE. GUIDE's LICREG contains further obligations for him to use HIPY as a Verifier for any party GUIDE uses to source guide data to GUIDE's program guide application. GUIDE signing up for HIPY will draw the program guide data provider that supplies GUIDE into the ecosystem, in that GUIDE can only choose a provider that is also licensed to HIPY as a Claimant. The choice of guide data provider is subject to LICREG because the GUIDE is subject to LICREG.

5. BROWSER becomes aware that he needs access to the functions of MIDDLEWARE. The BROWSER signs up to LICREG to gain such access as a HIPY Claimant. BROWSER's LICREG contains further obligations for him to use HIPZ for any web site that BROWSER accesses. This will draw all web site sources accessible from BROWSER into the ecosystem. The web site sources may not be subject to LICREG. The choice of those web site sources is subject to LICREG because the BROWSER is subject to LICREG.

The net result is that LICENT controls the ecosystem to a highly pervasive degree. This control not only includes the ecosystem Actors CASDRM, MIDDLEWARE, GUIDE, and BROWSER, but also to a lesser extent the provider of guide data and even the web sites accessible through the BROWSER.

Such a degree of control may not be desirable for a good long term strategy. For example, a more nominal version of a controlled ecosystem may omit any controls over BROWSER, Web Sites, and the Guide Data Provider. This aggressive example does illustrate how extensive controls could be established over an ecosystem using the techniques herein, which would impose the contractual obligations described upon Actors CASDRM, MIDDLEWARE, GUIDE, BROWSER, the provider of guide data to GUIDE, and the web sites accessible through BROWSER.

FIG. 8 provides a diagram of this example controlled ecosystem. Observe in FIG. 8 that the Guide Data Provider 810 and the Web Sites 812 are not so completely drawn into the ecosystem's contractual obligations as are CASDRM 802, MIDDLEWARE 804, GUIDE 806, or BROWSER 808. They would have Licensing Regime 800 obligations with regard to how BROWSER 808 and GUIDE 806 work with them, but they would not have obligations to further propagate the ecosystem to any other parties.

Further observe from FIG. 8 that different Actors need different rights from LICREG. CASDRM is a HIPX Verifier Licensee only. MIDDLEWARE has LICREG licenses to HIPX as a Claimant and HIPY as a Verifier. GUIDE has LICREG licenses to HIPX as a Claimant and HIPY as both Verifier and Claimant. BROWSER has LICREG licenses to HIPY as a Claimant and HIPZ as a Verifier. The Guide Data Provider has a LICREG license to HIPY as a Claimant. The Web Sites accessed by BROWSER have LICREG license to HIPZ only if that option is elected.

Although the present system, method and apparatus has been described above with particularity, this was merely to teach one of ordinary skill in the art how to make and use the in system, method and/or apparatus. Many additional modifications will fall within the scope of the system, method and/or apparatus, as that scope is defined by the following claims.

What is claimed:

1. A method for providing a handshake for secure transfer of data between a plurality of components in a cable system, each component including a processor and memory for storing code enabling the processor to perform steps of the method, the method comprising:

providing from a first Conditional Access System (CAS) to first Middleware a Challenge for handshaking;

receiving a Response to the Challenge from the Middleware at the first CAS, wherein the Response is calculated as a function IPF1 over the Challenge value wherein the function IPF1 is calculated based on data received from access to a first license agreement for licensing Intellectual Property (IP) rights referred to as Hook IP1 that is controlled by the CAS, and that the first Middleware has acquired rights to;

verifying the Response using the first CAS; and
returning an acknowledgement from the first CAS to the first Middleware allowing the first Middleware access to the CAS API;
providing from the CAS to an additional Actor in the cable system a Challenge;
receiving a Response to the Challenge from an additional Actor at the CAS, wherein the Response is calculated as the function IPF1 over the Challenge value wherein the function IPF1 is calculated based on data received from access to a second license agreement for licensing Intellectual Property (IP) rights referred to as Hook IP1 that is controlled by the CAS, and that the additional Actor has acquired rights to;
verifying the Response using the CAS; and
returning an acknowledgement from the CAS allowing the additional Actor access to the CAS API.

2. The method of claim 1, wherein the additional Actor comprises at least one of a second CAS, second Middleware, a Guide, a Guide Data Provider and a Browser for a Set-Top-Box.

3. The method of claim 1, further comprising:
providing from an additional Actor to a second additional Actor in the cable system a Challenge;
receiving a Response to the Challenge from a second additional Actor at the additional Actor, wherein the Response is calculated as a function IPF2 over the Challenge value wherein the function IPF2 is calculated based on data received from access to a second license agreement for licensing Intellectual Property (IP) rights referred to as Hook IP2 that is controlled by the additional Actor, and that the second additional Actor has acquired rights to;
verifying the Response using the additional Actor; and
returning an acknowledgement from the additional Actor allowing the second additional Actor access to the CAS API.

4. The system of claim 3, wherein the second additional Actor comprises at least one of: a second CAS, second Middleware, a Guide, a Guide Data Provider and a Browser for a Set-Top-Box.

5. The method of claim 1, further comprising:
providing from the CAS to a second CAS in a separate cable system a Challenge;
receiving a Response to the Challenge from a CAS to the second CAS, wherein the Response is calculated as the function IPF 1 over the Challenge value wherein the function IPF 1 is calculated based on data received from access to a first license agreement for licensing Intellectual Property (IP) rights referred to as Hook IP 1 that is controlled by the CAS, and that the second CAS has acquired rights to;
verifying the Response using the CAS; and
returning an acknowledgement from the CAS allowing the second Actor access to the CAS API.

6. The method of claim 1, further comprising:
providing from the CAS to a second Actor in a separate cable system a Challenge;
receiving a Response to the Challenge from a CAS to the second Actor, wherein the Response is calculated as the function IPF 1 over the Challenge value wherein the function IPF 1 is calculated based on data received from access to a first license agreement for licensing Intellectual Property (IP) rights referred to as Hook IP 1 that is controlled by the CAS, and that the second Actor has acquired rights to;
verifying the Response using the CAS; and
returning an acknowledgement from the CAS allowing the second Actor access to the CAS API.

7. The method of claim 1, further comprising:
providing from the additional Actor in the cable system a Challenge;
receiving a Response to the Challenge from a second additional Actor, wherein the Response is calculated as the function IPF1 over the Challenge value wherein the function IPF1 is calculated based on data received from access to a second license agreement for licensing Intellectual Property (IP) rights referred to as Hook IP1 that the second additional Actor has acquired rights to;
verifying the Response using additional Actor; and
returning an acknowledgement from the additional Actor allowing the second additional Actor access to the CAS API.

8. The method of claim 7, wherein the second additional actor comprises at least one of a CAS, Middleware, a Guide, a Guide Data Provider and a Browser for a Set-Top-Box.

* * * * *